United States Patent [19]
Patel et al.

[11] Patent Number: 5,654,094
[45] Date of Patent: Aug. 5, 1997

[54] METAL CARBIDE FIBERS

[75] Inventors: Kundan M. Patel, Randolph; Frank Mares, Whippany, both of N.J.

[73] Assignee: AlliedSignal Inc., Morris Township, N.J.

[21] Appl. No.: 461,336

[22] Filed: Jun. 5, 1995

Related U.S. Application Data

[60] Continuation-in-part of Ser. No. 451,342, May 26, 1995, which is a division of Ser. No. 836,481, Feb. 18, 1992, Pat. No. 5,429,778, which is a continuation-in-part of Ser. No. 376,465, Jul. 7, 1989, abandoned.

[51] Int. Cl.$^6$ .................................... C04B 35/58
[52] U.S. Cl. ..................... 428/367; 428/397; 428/401; 428/698; 423/440; 423/439; 423/291; 423/345
[58] Field of Search ........................... 428/695, 397, 428/401, 367; 423/440, 439, 345, 291

[56] References Cited

U.S. PATENT DOCUMENTS

| | | | |
|---|---|---|---|
| 4,800,180 | 1/1989 | McAllister et al. | 501/89 |
| 4,832,895 | 5/1989 | Johnson | 501/96 |
| 5,279,780 | 1/1994 | Lipowitz et al. | 264/29.2 |
| 5,407,734 | 4/1995 | Singh et al. | 428/364 |
| 5,429,778 | 7/1995 | Patel et al. | 264/66 |

*Primary Examiner*—Archene Turner
*Attorney, Agent, or Firm*—Michele G. Mangini; Roger H. Criss

[57] ABSTRACT

This invention relates to a process for forming metal or non-metal carbide fiber from the corresponding metal or non-metal containing material such as a silicon sol or mixtures thereof and silicon, silicon carbide or silicon oxide, or mixtures of silicon carbide and silicon or silicon oxide.

1 Claim, No Drawings

METAL CARBIDE FIBERS

CROSS-REFERENCE TO RELATED APPLICATIONS

This application is a continuation-in-part application of U.S. Ser. No. 08/451,342 filed on May 26, 1995 pending, which is a divisional application of U.S. Ser. No. 07/836,481 filed Feb. 18, 1992 now U.S. Pat. No. 5,429,778 which issued on Jul. 4, 1995 which is a continuation-in-part of application of U.S. Ser. No. 07/376,465 filed Jul. 7, 1989 now abandoned.

BACKGROUND OF THE INVENTION

1. Field of the Invention

This invention relates to a process for preparation of metal and non-metal carbide fibers. More particularly, this invention relates to a process for preparation of metal and non-metal carbide fibers having improved properties.

2. Prior Art

In the automotive and the aerospace industries, there is a need for fiber reinforced light metal alloys based on aluminum, magnesium, titanium or titanium-aluminide, and for fiber reinforced, and toughened ceramic materials. Such composites have the potential for reducing weight and/or providing higher heat resistances, and better strength and stiffnesses. In some cases these composites also provide superior toughness and fatigue resistance. Development of these advanced composite materials requires, however, fine diameter ceramic fibers, which retain adequate strength well above 1000° C.

An improved process for manufacturing metal carbide products is described in U.S. Pat. No. 4,126,652. In that process, a metal carbide containing molded product is formed by heating a composition comprising a powdery metal and an acrylonitrile polymer to a temperature of about 200° C. to 400° C., and then calcining the resulting product at a temperature of from about 900° C. to 2500° C. in an inert atmosphere. This process suffers from a number of inherent disadvantages. For example, this process is not suitable for preparation of metal carbide fibers because fibers prepared by this process lack sufficient strength and density. Other disadvantages include large number of voids or pores, and low or no thermal stability. Fibers prepared in accordance with the process of this, patent are unsuitable for fiber reinforcement for metals and plastics.

SUMMARY OF THE INVENTION

The present invention relates to a process for forming metal and non-metal carbide fibers. In general, the invention is directed to a process for the preparation of metal and non-metal carbide fibers, said process comprising the steps of:

(a) stabilizing a fiber comprising at least a stoichiometrically equivalent amount of one or more carbon forming polymers of fiber forming molecular weight having uniformly or substantially uniformly dispersed therein:

a metal or non-metal containing material selected from the group consisting of polymeric or cross-linked rmetal or non-metal alkoxides, hydroxides or alkoxides/hydroxides (sol) as for example a sol of a metal or non-metal selected from the group consisting of B, Ti, Si, Zr, Hf, V, Nb, Ta, Mo, U, Cr, Fe and W, a mixture of one or more of said sols and one or more of said metals, non-metals, oxides of said metals, oxides of said non-metals, carbides of said metals, carbides of said non-metals or a combination thereof or a mixture of one or more of said metal carbides, non-metal carbides or a combination thereof and one or more of said metals, said non-metals, said metal oxides, said non-metal oxides or a combination thereof said material in particulate form having an average particle size equal to or less than about 5 um, and said fiber further comprising a sintering effective amount of one or more effective sintering aids and a grain growth preventive amount of one or more grain growth preventive agents, said fiber substantially free or free of voids having an average size greater than about 1 um by heating said fiber at a temperature in an oxidizing atmosphere for a time sufficient to form said stabilized fiber;

(b) carbonizing said stabilized fiber by heating said fiber at a temperature in an inert or substantially inert atmosphere for a time sufficient to form a carbonized fiber comprising carbon, said material, said sintering aids and said grain growth preventive agents;

(c) reacting said carbon and said metal or non-metal material in said carbonized fiber by heating said fiber in an inert temperature atmosphere or substantially inert atmosphere at a temperature and for a time sufficient to form a fiber comprising the metal or non-metal carbide of said mixture or said solvent having a density of at least about 60% of the theoretical density of said metal or non-metal carbide; and (d) sintering said fiber comprising said metal or non-metal carbide by heating said fiber in an inert atmosphere or substantially inert atmosphere for a time and at a temperature sufficient to form metal or non-metal carbide fiber having a density of greater than about 70% of the theoretical density of the metal or non-metal carbide.

The preferred embodiment of this invention relates to a process for forming such fibers which comprises:

(a) forming a solution of at least a stoichiometrically equivalent amount of one or more carbon forming polymers of fiber-forming molecular weight in a first solvent, said solution having dispersed therein a metal or non-metal containing material selected from the group consisting of polymeric or cross-linked rmetal or non-metal alkoxides, hydroxides or alkoxides/hydroxides (sol) as for example a sol of a metal or non-metal selected from the group consisting of B, Ti, Si, Zr, Hf, V, Nb, Ta, Mo, U, Cr, Fe and W, a mixture of one or more of said sols and one or more of said metals, non-metals, oxides of said metals, oxides of said non-metals, carbides of said metals, carbides of said non-metals or a combination thereof or a mixture of one or more of said metal carbides, non-metal carbides or a combination thereof and one or more of said metals, said non-metals, said metal oxides, said non-metal oxides or a combination thereof; a sintering effective amount of one or more effective sintering aids and a grain growth preventive amount of one or more grain growth preventive agents, said materials, sintering aids and grain growth preventive agents in particulate form having an average particle size equal to or less than about 5 um;

(b) extruding said solution through a spinneret into a quench liquid comprising said first solvent and a liquid which is miscible in said first solvent and in which said polymer is insoluble or substantially insoluble hydrolyzing any sol that may be in said fiber to the corresponding metal or non-metal oxide to form a fiber containing said first solvent, said material or hydrolyzed derivative thereof, said sintering aid and said grain growth preventive agent;

(c) extracting said fiber containing said first solvent with a second solvent to form a fiber which is substantially free of first solvent and which is free, or substantially free of voids having a size greater than about 0.5 um, said extracted fiber having a substantially uniform or uniform distribution of said said material or hydrolyzed derivative thereof, said sintering aid and said grain growth preventive agent;

(d) stretching at least one of:
(i) the fiber containing the first solvent, and
(ii) the extracted fiber;

(e) stabilizing said extracted fiber by heating said fiber at a temperature of from about 125° C. to about 325° C. in an oxidizing atmosphere for a time sufficient to form said stabilized fiber;

(f) carbonizing said stabilized fiber by heating said stabilized fiber in an inert or substantially inert atmosphere at a temperature and for a time sufficient to form a carbonized fiber comprising carbon, said material or hydrolyzed derivative thereof, said sintering aid and said grain growth preventive agent;

(g) reacting said carbon and said material or hydrolyzed derivative thereof by heating said fiber in an inert or substantially inert atmosphere at a temperature and for a time sufficient to form a fiber comprising the metal carbide having a density of at least about 60% of the theoretical density of said metal or non-metal carbide; and (h) sintering said fiber comprising said metal or non-metal carbide by heating said fiber in an inert or substantially inert atmosphere for a time and at a temperature sufficient to form metal or non-metal carbide fiber having a density of greater than about 85% of the theoretical density of the metal carbide.

As used herein, a "sol" is a linear polymer having recurring units of the formula: —M(OR)— or a totally or partially crosslinked material having recurring divalent, trivalent or tetravalent units of the formula:

where M is a meta or non-metal atom, n is 0, 1, 2 or 3 and R is alkyl, phenyl or hydrogen.

Another aspect of this invention relates to a metal or non-metal carbide mono-filament or multi-filament fiber consisting essentially of a metal or non-metal carbide having a density equal to or greater than about 85% of the theoretical density of said carbide, said fiber having an average cross-sectional diameter equal to or less than about 100 Mm, a tenacity of equal or greater than about 1.4 GPa and a tensile modulus of equal to or greater than aaaaabout 135 GPa.

Still another aspect of this invention relates to a composite comprising a polymer, metal or ceramic matrix having disperesed therein a plurality of monofilament of multifilament consisting essentially of a metal or non-metal carbide having a density equal to or greater than about 85% of the theoretical density of said carbide, said fiber having an average cross-sectional diameter equal to or less than about 100 Mm, a tenacity of equal to or greater than about 1.46 Pa and a tensile modulus equal to or greater than about 135 GPa.

DETAILED DESCRIPTION OF THE INVENTION

The first step of the process of this invention, comprises stabilizing a fiber substantially free of voids having an average size greater than about 1 um comprising one or more carbon forming polymer of fiber-forming molecular weight having uniformly or substantially uniformly dispersed therein an effective amount of a metal or non-metal containing material selected from the group consisting of polymeric or cross-linked metal or non-metal alkoxides, hydroxides or alkoxides/hydroxides (sol) as for example a sol of a metal or non-metal selected from the group consisting of B, Ti, Si, Zr, Hf, V, Nb, Ta, Mo, U, Cr, Fe and W, a mixture of one or more of said sols and one or more of said metals, non-metals, oxides of said metals, oxides of said non-metals, carbides of said metals, carbides of said non-metals or a combination thereof or a mixture of one or more of said metal carbides, non-metal carbides or a combination thereof and one or more of said metals, said non-metals, said metal oxides, said non-metal oxides or a combination thereof; a sintering effective amount of one or more effective sintering aids and a grain growth preventive amount of one or more grain growth preventive agents, said materials, sintering aids and grain growth preventive agents in particulate form having an average particle size equal to or less than about 5 um by heating said fiber at a temperature in an oxidizing atmosphere for a time sufficient to form said stabilized fiber.

As used herein, "stabilization" is the oxidative conversion and thermal cyclization of carbon forming polymer in said fiber into completely or partially crosslinked and cyclized infusible organic matrix. Stabilization is carried out for a time and at a temperature sufficient to form a stabilized fiber. If the stabilization step is carried out too long or at too high a temperature, there is a reduction in the amount of carbon available in the subsequent steps for reaction with the dispersed mixture of sols thereof which may result in metal or non-metal carbide fibers having dispersed unreacted mixtures of sols. Conversely, if the stabilization step is carried out at too low a temperature or for too short a period of time, hollow fibers may result upon carbonization. In the stabilization step of the process of this invention, the fiber is usually stabilized by heating at a temperature of from about 125° C. to about 350° C. in an oxidizing atmosphere for a time sufficient to form the stabilized fiber usually from about 0.25 hrs. to about 4.5 hrs. In the preferred embodiments of the invention, the fiber is stabilized by heating at a temperature of from about 135° C. to about 350° C. in an oxidizing atmosphere for a period of from about 0.5 hrs. to about 4.0 hrs. In the particularly preferred embodiments of the invention, the fiber is stabilized by heating at a temperature of from about 150° C. to about 325° C. in an oxidizing atmosphere for a period of from about 1 hr. to about 3.5 hrs. Amongst these particularly preferred embodiments most preferred are those embodiments in which the fiber is stabilized by heating in an oxidizing atmosphere at a temperature of from about 170° C. to about 300° C. for a period of from about 2 hrs. to about 3 hrs.

In the preferred embodiments of this invention, stabilization is carried out by heating the fiber at a number of different temperatures which allows for control over the rate of oxidative crosslinking and thermal cyclization so that the fiber will not over oxidize or decompose. For example, if the initial temperature is too high the reactions may occur too fast and the fiber may break. In these preferred embodiments, the fiber is usually initially heated at a temperature at the low end of the useful temperature range as for example at a temperature of from about 125° C. to about 175° C. for a period of from about 0.5 to about 1 hr., and thereafter the temperature is increased gradually at a constant or substantially constant rate, or step wise to a temperature in the high end of the range, as for example at temperatures of from about 175° C. to about 350° C. In these preferred embodiments for the preparation of silicon carbide, the fiber is stabilized by initial heating at a temperature of about 150° C. for from about 0.25 to about 1.5 hr., followed by heating at a temperature of about 225° C. for from about 0.25 hr. to about 1.5 hr., heating at a temperature of about 250° C. for from about 0.25 hr. to about 1.5 hr. and heating at a temperature of about 285° C. for from about 0.25 hr. to about 1.5 hr. In the particularly preferred embodiments of the invention, stabilization is carried out by heating the fiber at an initial temperature of from about 130° C. to about 190° C. for a period of from about 0.25 hr. to about 1.5 hr., and thereafter increasing the stabilization temperature either gradually at a constant or substantially constant rate, or stepwise to one or more temperatures of from about 200° C. to about 325° C.; and in the most preferred embodiments of the invention the stabilization is carried out by heating the fiber at an initial temperature of from about 150° C. to about 180° C. and thereafter increasing the stabilization temperature either gradually (at a constant or substantially constant rate) or step wise to a temperature of from about 200° C. to about 300° C.

During stabilization the fiber shrinks linearly and radially which may adversely affect the molecular orientation in the fiber which consequently may affect the carbonization and metal carbide reaction product of subsequent steps. During stabilization, linear shrinkage is controlled by maintaining the fiber under tension through manipulation of the ratio of the fiber input rate into the furnace to output rate of the fiber out of the furnace. In general, the ratios should be maintained such that shrinkage is less than about 25%. In the preferred embodiments of the invention, the ratios are maintained such that shrinkage is less than about 20%, and in the particularly preferred embodiments the ratios are maintained such that shrinkage is less than about 15%. Amongst these particularly preferred embodiments, most preferred are those embodiments in which the input to output ratios are such that shrinkage is less than about 10%.

Stabilization can be carried out using conventional techniques and furnaces for carbonization of acrylonitrile polymers. Illustrative of such techniques and apparatus are those described in "Carbon Fiber" by Jean Baptiste Bonnet and Roop Chand Bansal, International Fiber Science Technology Series, Vol. 3, Marcel Dekker, Inc., New York, N.Y. 1984.

The fiber used in the stabilization step preferably does not include voids greater than about 0.1 um in size. In the particularly preferred embodiments of this invention, the fiber does not include voids greater than about 0.05 um in size and in the most preferred embodiments of this invention any voids that may be present are less than about 0.025 um in size, with fibers substantially free of voids being the fibers of choice.

The deniers, tenacity and tensile modulus of the fiber may vary widely. In the preferred embodiments of the invention, the denier of the fiber is from about 5 to about 85, the tenacity of the fiber is at least about 0.5 g/denier (64.36 MPa) and the tensile modulus of the fiber is at least about 25 g/denier (3.22 GPa). In the particularly preferred embodiments of the invention fiber denier is from about 10 to about 50, fiber tenacity is from about 0.5 g/denier (64.36 MPa) to about 4.0 g/denier (515 MPa), and tensile modulus is from about 25 g/denier (3.22 GPa) to about 150 g/denier (19.31 GPa), and in the most preferred embodiments of the invention the denier of the fiber is from about 10 to about 40, the tenacity of the fiber is from about 0.8 g/denier (103 MPa) to about 3 g/denier (386 MPa) and the tensile modulus of the fiber is from about 35 g/denier (4.50 GPa) to about 100 g/denier (12.87 GPa).

Polymers for use in the process of this invention may vary widely, the only requirements are that they form carbon under the conditions of the process and that they are fiber forming. Illustrative of such polymers are polymers conventionally used in the formation of carbon fibers. Such polymers include acrylonitrile homopolymers and copolymers as for example polyacrylonitrile and copolymers of acrylonitrile and one or more monomers which are copolymerizable with acrylonitrile such as vinyl acetate, vinyl choride, methyl acrylate, methyl methacrylate and the like; cellulosics; asphalt and pitch materials; nonheterocyclic aromatic polymers such as phenolic polymers, phenol formaldehyde resin, polyacenaphthalene, polyacrylether, polyphenylene, certain polyamides and the like aromatic heterocyclic polymers such as polyimides, polybenzimidazole, polytriazoles and the like; linear polymers such as polyethylene, polypropylene, polyvinyl chloride and the like; and digested coal.

Preferred polymers for used in the practice of this invention are acrylonitrile polymers. Acrylonitrile polymers for use in the practice of this invention includes acrylonitrile homopolymers and copolymers containing not less than about 80 mole %, preferably not less than about 85 mole %, more preferably not less than about 90 mole % of and most preferably not less than about 94 mole % of acrylonitrile based on the total of moles of recurring monomeric units. When the acrylonitrile polymer is a copolymer, the other monomeric units may be derived from any monomer which is copolymerizable with acrylonitrile and which includes pendant groups containing active hydrogen or such groups which can be converted into pendant groups containing active hydrogen on heating. Illustrative of such groups are those of the formula:

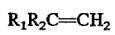

wherein:

$R_1$ and $R_2$ are the same or different and are hydrogen, hydroxy, amine, amide, cyano carboxy or alkoxycarbonyl. Illustrative of such monomers are styrene, ethylene, propylene, 1-octadecene, isobutylene, 1-pentene, 4-methoxystyrene, 3-methyl-1-hexene, 4-methylpentene, vinyl acetate, acrylic acid, methacrylic acid, methyl acrylate, tert-butylacrylate, butyl acrylate, isobutyl acrylate, vinyl propionate, vinyl isopropenyl ketone, propyl methacrylate, acrylamide, phenyl methacrylate, isobutyl methacrylate, sec-butyl methacrylate, ethyl acrylate, 2-hydroxyethyl acrylate, iraconic acid, allylamine, 1-methylstyrene, N,N-dimethylacrylamide, vinylidene cyanide, methacrylonitrile, 1-cyanovinyl acetate, allyl alcohol, methallyl alcohol and the like.

In the preferred embodiments of the invention, copolymerizable monomers are acrylic acid, methacrylic acid and their ester derivatives, and acrylamide and its derivatives. In the particularly preferred embodiments of the invention, copolymerizable monomers are acrylic acid, methacrylic acid and their derivatives. In the most preferred embodiments of the invention, the acrylonitrile polymer of choice is polyacrylonitrile.

The molecular weight of the acrylonitrile polymer may vary widely, the only requirement is that the polymer is of fiber forming molecular weight. Such a molecular weight is well known to those of skill in the art and is usually at least about 10,000. In the preferred embodiments of the invention the molecular weight of the polymer is from about 20,000 to about 1,200,000, and in the particularly preferred embodiments of the invention the molecular weight of the polymer is from about 50,000 to about 500,000. Amongst these particularly preferred embodiments, most preferred are those embodiments in which the molecular weight of the polymer is from about 100,000 to about 200,000.

An amount of the polymer is used which is "stoichiometrically equivalent" to the amount of metal or non-metal containing material capable of reacting with the carbon carbonized from the polymer as the metals, non-metals, metal oxides, non-metal oxides and the like. As used herein a "stoichiometrically equivalent" amount of the polymer is an amount which under process conditions is sufficient to form an amount of carbon (on carbonization of the polymer to carbon in the carbonization step) at least sufficient to react with all or substantially all of the metal or non-metal containing material capable of reacting with the carbon as the metals, non-metals, metal oxides, non-metal oxides and the like to convert same to the corresponding metal or non-metal carbide. The stoichiometrically equivalent amount of polymer employed in any situation will vary widely, depending on a number of factors as for example, the efficiency of the carbonization step, and the oxidation state of the metal in the metal or non-metal oxide or mixtures. The greater the efficiency of the carbonization step, the lesser the stoichiometrically equivalent amount of polymer required. Similarly, the higher the oxidation state of the metal or non-metal in the metal or non-metal oxide or mixture, the greater the stoichiometrically amount of polymer required. For example, using silicon dioxide either added directly as such or produced in situ by hydrolysis of the silicon sol as the example, the reaction of an equimolar mixture silicon dioxide and silicon carbide is as follows:

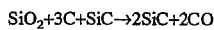

$$SiO_2 + 3C + SiC \rightarrow 2SiC + 2CO$$

In this reaction, three equivalents of carbon are reacted with an equivalent of silicon dioxide to produce two equivalent of carbon monoxide and one equivalent of silicon carbide. Similarly, using a mixture of silicon carbide and silicon as the example, the reaction with carbon is as follows:

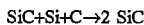

$$SiC + Si + C \rightarrow 2\,SiC$$

In this reaction, one equivalent of silicon reacts with one equivalent of carbon to produce one equivalent of silicon carbide.

Similarly, using boron as an example, the reaction of a mixture of boron oxide and boron carbide and carbon is as follows:

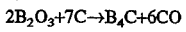

$$2B_2O_3 + 7C \rightarrow B_4C + 6CO$$

In this reaction, seven equivalents of carbon are reacted with two equivalents of boron oxide to produce six equivalents of carbon monoxide and one equivalent of boron carbide.

Using silicon the reaction of carbon and elemental silicon in as follows:

$$Si + C \rightarrow SiC$$

In this reaction, one equivalent of silicon reacts with one equivalent of carbon to produce one equivalent of silicon carbide. In this example, the amount of polyacrylonitrile polymer employed is sufficient on carbonization to form an amount of carbon which is sufficient to react with all or substantially all of the silicon present in accordance with the above described stoichiometry. The stoichiometrically equivalent amount of polymer employed in any situation will vary widely, depending on a number of factors as for example, the efficiency of the carbonization step, the form of the metal and the like. The greater the efficiency of the carbonization step, the lesser the stoichiometrically equivalent amount of polymer required.

In the preferred embodiments of this invention the amount of polymer employed is from about a stoichiometrically equivalent amount of the polymer to about a stoichiometrically equivalent amount plus and amount of the polymer sufficient on carbonization to provide an excess of up to about 5 wgt. % of carbon based on the amount of carbon required to react with all of the metal oxide in the fiber to form the corresponding metal carbide. In the particularly preferred embodiments of the invention, the amount of polymer employed is from about a stoichiometrically equivalent amount to about an stoichiometrically equivalent amount of the polymer plus an amount of the polymer sufficient on carbonization to provide an excess of carbon of from about 0.25 to about 3 wgt. %. In the most preferred embodiments of the invention, the amount of polymer employed is from about a stoichiometrically equivalent amount to about an stoichiometrically equivalent amount of the polymer plus an amount of the polymer sufficient on carbonization to provide an excess of carbon of from about 0.5 to 3 wgt. % with a stoichiometrically equivalent amount of the polymer plus an amount of the polymer which on carbonization is sufficient to provide an excess of carbon of from about 1 to about 2 wgt. % being the amount of choice.

The fiber contains one or more metal or non-metal containing materials selected from the group consisting of polymeric or cross-linked rmetal or non-metal alkoxides, hydroxides or alkoxides/hydroxides (sol) as for example a sol of a metal or non-metal selected from the group consisting of B, Ti, Si, Zr, Hf, V, Nb, Ta, Mo, U, Cr, Fe and W, a mixture of one or more of said sols and one or more of said metals, non-metals, oxides of said metals, oxides of said non-metals, carbides of said metals, carbides of said non-metals or a combination thereof or a mixture of one or more of said metal carbides, non-metal carbides or a combination thereof and one or more of said metals, said non-metals, said metal oxides. Preferred for use in the practice of this invention are materials containing B, Ti, Si, and W. Most preferred for use in the practice of this invention are silicon containing materials such as silicon sols, silicon, silicon carbides, silicon oxides such as $SiO_2$ and $SiO$ and $SiC$ and combinations thereof.

The metal or non-metal containing materials are in particulate form having a particle size equal to or less than about 5 um, preferably less than about 2 um. The lower limit for particle size is not critical, and usually the smaller size particles are preferred because the size of voids in the fiber formed from the reaction of the metal or non-metals or oxides and carbide thereof and the carbon is directly proportional to the size of the particles. In the preferred embodiments of this invention, particle size is equal to or less than about 0.3 um and in the particularly preferred embodiments particle size is from about 0.01 um to about 0.3 um. In the most preferred embodiments, metals or non-metals or oxide or carbides thereof particle size is from about 0.01 um to about 0.1 um.

The fiber also contains a sintering effective amount of an effective sintering aid which promotes the sintering of the metal or non-metal carbide during the sintering step. As used herein an "effective sintering aid" is a one or more metals and/or metal compounds which upon sintering are effective to promote the diffusibility of the metal or non-metal carbide to increase the density of the metal or non-metal carbide and as used herein, "a sintering effective amount" of an effective sintering aid is an amount of such aid which is effective to promote the diffusibility of the metal or non-metal carbide on heating and to increase the density of the metal or non-metal carbide to any extent. The fiber also includes a "grain growth preventive amount" of one or more "effective grain growth preventive agents". Also, as used herein, "grain growth preventive agents" are one or more metals and/or metal compounds which upon sintering are effective to prevent or retard grain growth to minimize crystallite size in the metal or non-metal carbide, and as used herein a "grain growth preventive amount" of a grain growth preventive agent is an amount sufficient to prevent grain growth of the metal or non-metal carbide to any extent. Any material which is effective to function as a sintering aid and/or a grain growth preventive agent can be used. In the preferred embodiments of the invention, one material functions as both a sintering aid and a grain growth preventive agent. Illustrative of such effective sintering aids and grain growth preventive agents are boron, boron carbide, aluminum, aluminum oxide, titanium nitride, titanium boride, aluminum nitride, and yttrium oxide or any organic or inorganic precursor materials which form any of the foregoing under process conditions in particulate form having a particle size of less than about 5 um. Preferred sintering aids and grain growth preventive agents for use in the practice of this invention will vary with the metal or non-metal carbide formed. In the preferred embodiments of the invention where silicon carbide is formed, sintering aids and grain growth preventive agents are selected from the group consisting of boron, boron carbide, aluminum, aluminum oxide, yttrium oxide, titanium nitride, titanium boride, aluminum nitride in particulate form having an average particle size equal to or less than about 3 um, preferably equal to or less than about 1 um.

The amount of sintering aids and grain growth prevention agents may vary widely. In general, the amount employed is equal to or less than about 5 wgt. % by weight of the metal or non-metal carbide in the fiber after the metal or non-metal oxide and carbon reaction step. In the preferred embodiments of the invention, the amount of sintering aids and grain growth preventive agents is equal to or less than about 2 wgt. % by weight of metal or non-metal carbide present in the reacted fiber and in the particularly preferred embodiments of the invention, the amount of said aids and agents is equal to or less than about 1.5 wgt. % on the aforementioned basis.

The fiber for use in the practice of this invention can be prepared using conventional fiber forming techniques. For example, these fibers can be formed by conventional processes such as melt, solution, dry and gel spinning techniques. Illustrative of suitable fiber spinning processes and melt spinning techniques and apparatus for carrying out these processes are those described in "Man Made Fibers Science and Technology", Vol. 1–3, H. F. Mark et al., Interscience, New York, 1968; "Encyclopedia of Polymer Science and Technology", Vol. 3; "Fundamentals of Fiber Formations" by Androzij Ziabiki, Wiley and Sons, New York, N.Y. (1971); "Encyclopedia of Polymer Science and Technology", Vol. 3, pps. 326–381; and U.S. Pat. Nos. 4,454,196 and 4,410,473.

In the preferred embodiments of the invention the fibers are prepared by a process of this invention. In the first step of the process of this invention, a solution of a stoichiometrically equivalent amount of an polymer of fiber forming molecular weight as for example, a acrylonitrile polymer having dispersed therein one or more metal oxides selected from the group consisting of B, Ti, Si, and W metal oxides, a sintering effective amount of one or more effective sintering aids and a grain growth preventive amount of one or more grain growth preventive agents, said metal oxides, sintering aids and grain growth preventive agents being in particulate form having a particle size equal to or less than about 5 um is formed.

The relative amounts of ingredients in the solution/dispersion may vary widely. The only requirement is that the amount be sufficient to provide a fiber having the relative concentration of components described above on drying of the extruded fiber.

Useful solvents may vary widely, the only requirement is that the acrylonitrile fiber of choice is soluble in the solvent to the necessary extent. Useful and preferred solvents include dimethyl sulfoxide (DMSO), tetramethylene sulfoxide, N-methyl pyrrolidone (NMP), dimethylformamide (DMF), dimethyl-acetamide (DMAC), gamma-butyrolactone and ethylene carbonate. Other homologs and analogs of these solvents (e.g., propylene carbonate) may also be used. Less preferred are aqueous solutions of salts such as concentrated aqueous sodium thiocyanate and aqueous zinc chloride. DMF and DMSO are preferred solvents and DMF is the most preferred solvent.

In the second step of the process for preparation of the fiber, the solution is extruded through an aperture directly into or through an air gap into a quench bath. Any conventional procedure using conventional apparatus can be used. The nature of the aperture is not critical and can vary widely. Useful apertures include those of circular cross sections, oval cross sections, Y-shaped cross sections, X-shaped cross sections and the like. The diameter of the aperture is also not critical. The length of the aperture in the flow direction may vary widely. The width, depth and height of the aperture are also not critical.

The nature of the liquid in the quench bath is critical. The quench bath liquid is a mixture of one or more solvents for the acrylonitrile polymer and one or more non-solvents for the polymer, which non-solvents are miscible in the solvents. The amount of non-solvents is critical and the amount should be such that upon stretching and drying the fiber will be substantially free of voids having an average size of greater than about 0.5 um. Usually, if too little non-solvent is included in the bath, the extruded solution/dispersion will not gel, coagulate or otherwise solidify into the desired fiber. If too much non-solvent is included in the bath, the extruded solution/dispersion will solidify too fast forming a sheath about the outer circumference of the fiber. The sheath prevents and retards the outflow of solvent from the interior of the fiber resulting in large voids greater than about 0.5 um in the dried and stretched fiber. In the preferred embodiments of the invention, the quench bath will preferably comprise a mixture of the first solvent and an amount of water which is sufficient to result in a gelled, coagulated or otherwise solidified fiber having the required characteristics as described above. Preferably when the metal carbide being formed is silicon carbide, the quench bath is composed of the first solvent, preferably dimethyl formamide or dimethylsulfoxide, containing from about 10 to about 60 Vol. % water based on the total volume of liquid in the quench bath. In the particularly preferred embodiments of the invention when the metal carbide is silicon carbide, the quench bath contains a mixture of dimethyl sulfoxide or dimethyl formamide containing from about 15 to about 30 Vol. % water based on the total volume of liquid in the quench bath, and in the most preferred embodiments of the invention when the metal carbide is silicon carbide, the quench bath contains a mixture of dimethyl sulfoxide or dimethyl formamide containing from about 18 to about 25 Vol. % water on the aforementioned.

Some stretching during extrusion and quenching is not excluded from the present invention.

The solidified fiber resulting from extrusion and quenching consists of a polymeric network swollen with solvent. In the next step of the process of forming the fiber, the solvent swollen fiber is extracted with a second solvent using conventional solvent extraction techniques. When the first solvent is DMSO or DMF, a suitable and representative second solvent is water. Conditions of extraction preferably should remove the first solvent to less than about 1% solvent by weight of polymer in the fiber after extraction leaving the solid network of polymer substantially intact using conventional techniques and apparatus.

Stretching may be performed upon the fiber after or during quenching or during or after extraction. Alternatively, stretching of the dried fiber may be conducted, or a combination of stretching the solvent filled fiber or stretching the dried fiber may be performed. The first stage stretching may be conducted in a single stage or it may be conducted in two or more stages. The first stage stretching may be conducted at room temperature or at an elevated temperature. Preferably stretching is conducted in two or more stages with the last of the stages performed at a temperature between 80° C. and 275° C. Most preferably stretching is conducted in more than two stages with the last of the stages performed at a temperature between 90° C. and 150° C. Such temperatures may be achieved with heated tubes or with other heating means such as heating blocks or steam jets.

In the next steps of the process, the fibers are subjected to various heat treatments to carbonize the stabilized fiber into carbon fiber containing particles of the metal or non-metal containing material with the required carbon to metal and/or non-metal atom ratio, to react all or a portion of the metal or non-metal containing material and carbon to form metal carbide fiber, and to sinter the metal carbide fiber to remove all or a portion of the voids in the fiber and to form a metal carbide fiber of the desired density and having the desired crystallite size. In the carbonization heating step, the stabilized fiber is carbonized into carbon fibers containing carbon and the metal or non-metal containing material having the required carbon to metal and/or non-metal atom ratio by heating the stabilized fiber in an inert atmosphere. During carbonization all or substantially all non-carbon elements present in the stabilized fiber are eliminated in the form of volatiles. The carbonized fiber is preferably free or substantially free of voids and of impurities. Carbonization temperatures and times may vary widely. In general, carbonization temperatures are from about 350° C. to about 1400° C. and carbonization times are from about 0.25 hr. to about 4 hrs. In the preferred embodiments of the invention, carbonization temperatures are from about 375° C. to about 1300° C. and carbonization times are from about 0.25 hr. to about 3 hr., and in the particularly preferred embodiments of the invention carbonization temperatures are from about 400° C. to about 1250° C. and carbonization times are from about 0.25 hr. to about 2 hrs. Amongst these particularly preferred embodiments, most preferred are those embodiments in which the carbonization temperature is from about 400° C. to about 1250° C. and carbonization times are from about 0.5 hr. to about 1.5 hr.

As in the case of stabilization, in carbonization the stabilized fiber is preferably heated at more than one temperature within the range. For example, in these preferred embodiments of the invention, the stabilized fiber is initially heated at a temperature at the lower end of the above referenced temperature range and the temperature is increased stepwise or gradually at a constant or substantially constant rate to a temperature at the higher end of the range to control the rate of carbonization. In the preferred embodiments of the invention, the fiber is carbonized by initially heating the fiber for from about 0.25 hr. to about 0.5 hr. at a temperature of from about 350° C. to about 450° C. and thereafter increasing the temperature gradually at a constant or substantially constant rate or stepwise to a final temperature of from about 1000° C. to about 1400° C., more preferably from about 1200° C. to about 1350° C. where the fiber is heated until carbonization is essentially complete.

Carbonization is carried out in an atmosphere which is inert or substantially inert under carbonization conditions. Useful atmospheres may vary widely. Use of oxygen in the atmosphere results in the formation of additional metal or non-metal oxides. This reaction reduces the amount of carbon available for reaction with the metal or non-metal containing material in the subsequent reacting step, which may result in a metal or non-metal carbide fiber having metal or non-metal oxide impurities. The preferred inert atmosphere is argon.

In the reaction heating step, the carbonized fiber is converted into metal or non-metal carbide fiber by reaction of all or a portion of the metal or non-metal containing material and carbon. Temperatures and heating times may vary widely. The reacting step can be carried out in a single discrete step or can be carried out jointly as a part of the sintering step. In general, the carbonized fiber is heated in an inert or substantially inert atmosphere at a temperature and time sufficient to react all or substantially all of the metal oxides to form the corresponding metal or non-metal carbide having a density of at least about 60% of the theoretical density of the metal or non-metal carbide. The reaction of carbon and metal or non-metal oxides which may be present may require time periods up to about 1 hr. to go to completion. In the preferred embodiments of the invention, the metal or non-metal oxides are reacted by heating the carbonized fiber to a temperature of from about 1000° C. to about 2000° C., until all or substantially all of the metal or non-metal oxides have been reacted to form the metal or non metal carbide fiber having the desired density, usually for from about 0.25 hr. to about 1 hr. is formed. The fiber can be heated at a single temperature or at two or more different temperatures within the range. In the particularly preferred embodiments, the fiber is heated at a different temperature within the range of from about 1200° C. to about 1800° C. until all or substantially all of the metal or non-metal oxides have reacted, and in the most preferred embodiments of the invention the fiber is heated to a temperature of from about 1200° C. to about 1650° C. preferably from about 1250° C. to about 1600° C. until the reaction is essentially complete and meta or non-metall carbide fiber of the required density is formed.

As in the case of carbonization and stabilization the fiber is preferably heated under tension to avoid shrinkage in the reaction of the metal or non-metal containing materials and the carbon. The metal or non-metal containing material and carbon have a lower density than the metal or non-metal carbide so that the reaction of the metal or non-metal containing material and carbon results in voids. In general, the average size of the voids is equal to or less than about 2 um and a crystallite size of less than about 1 um. In the preferred embodiments of the invention, the average size of the voids is equal to or less than about 1 um and a crystallite size of less than about 0.5 um; and in the particularly preferred embodiments average void size is equal to or less than about 0.5 um and a crystallite size of less than about 0.1 um. Amongst these particularly preferred embodiments, most preferred are those embodiments in which average void size is equal to or less than about 0.3 um; and a crystallite size equal to or lo less than about 0.05 um.

In the final heating step, the metal or non-metal carbide fiber is sintered and densified. In general, the metal or non-metal carbide is heated in an inert or substantially inert atmosphere other than nitrogen for a time and at a temperature sufficient to form a metal or non-metal carbide fiber having a density of greater than about 85% of the theoretical density of the metal or non-metal carbide. Theoretical density values for metal or non-metal carbides are well known in the art and can be determined by known methods or obtained from Handbook of Chemistry and Physics, 66 Ed., CRC Press, Boca Raton, Fla. In the preferred embodiments of the invention, the metal or non-metal carbide fibers are heated for a time and at a temperature sufficient to provide a metal carbide fiber having a density equal to or greater than about 90% of the theoretical density of the metal or non-metal carbide, and in the particularly preferred embodiments of the invention the metal or non-metal carbide fibers are heated for a time and at a temperature sufficient to provide a metal or non-metal carbide fiber having a density greater than 95% of the theoretical density of the metal or non-metal carbide. Amongst these particularly preferred embodiments of the invention, most preferred are those embodiments of the invention in which the metal or non-metal carbide fibers are heated for a time and at a temperature sufficient to provide a metal or non-metal carbide fiber having a density of from about 98% to about 99.9% of the theoretical density of the metal or non-metal carbide.

In the preferred embodiments of the invention, the metal or non-metal carbide fiber is sintered by heating for from about 0.5 hrs. to about 4 hrs. at a temperature in excess of about 1500° C. in an inert or substantially inert atmosphere. In the particularly preferred embodiments, the metal or non-metal carbide fiber is sintered by heating at a temperature of from about 1500° C. to about 2500° C. for from about 0.5 hrs. to about 2 hrs., and in the most preferred embodiments the metal or non-metal carbide is sintered by heating at a temperature of from about 1500° C. to about 2200° C. for from about 0.5 hrs. to about 1.5 hrs.

The metal or non-metal carbide fiber can be sintered by heating at a single temperature within the temperature range, or by heating at two or more temperatures within the range. In the particularly preferred embodiments, the metal or non-metal carbide fiber is heated at two or more temperatures within the range of from about 1500° C. to about 2200° C. In the initial heating, the fiber is heated to a temperature within the lower end of the range such as from about 1500° C. to about 1600° C., for from about 0.5 hrs. to about 1 hr. The temperature is then increased gradually at a constant or substantially constant rate or stepwise as a function of time (usually over a period of from about 0.2 hrs. to about 1 hr.) to a temperature in the higher end of the range such as from about 2000° C. to about 2200° C. and maintained there until the metal carbide of the required density is obtained usually of from about 0.5 hrs. to about 1 hr. As in the case of carbonization, stabilization and the reacting step, the fiber is heated under tension.

The stabilization, carbonization, reacting and sintering can be carried out using a conventional technique and furnaces for carbonization of acrylonitrile polymers. Illustrative of such techniques and apparatuses are those described in "Carbon Fiber" by Jean Baptiste Bonnet and Roop Chand Bansal, International Fiber Science Technology Series, Vol. 3, Marcel Dekker, Inc., New York, N.Y. 1984.

The metal or non-metal carbide fiber formed by the process of this invention consist essentially of metal or non-metal carbide in the absence or substantial absence (less than about 5% by wgt, preferably less than about 2% by wgt, more preferably less than about 1% by wgt and most preferably less than about 0.5% by wgt of the fiber) of metal or non-metal and carbon or other materials. The fiber of this invention in general will exhibit a density equal to or greater than about 85% of the theoretical density of such material. In the preferred embodiments of the invention the metal or non-metal carbide fibers will have a density equal to or greater than about 90% of the theoretical density of the metal or non-metal carbide, and in the particularly preferred embodiments of the invention the metal or non-metal carbide fibers will have a density of from about 99% to about 99.99% of the theoretical density of the metal or non-metal carbide. Amongst these particularly preferred embodiments of the invention most preferred are those embodiments of the invention in which the density of the metal or non-metal carbide fiber is from about 98% to about 99.99% of the theoretical density of the metal or non-metal carbide.

The diameter, tenacity and tensile modulus of the metal or non-metal carbide fiber of this invention may vary widely. Usually, the cross-sectional diameter of fiber of this invention is usually equal to or less than about 100 Mm, the tenacity of the fiber of this invention is equal to or greater than about 1.46 Pa and the tensile modulus of the fiber of this invention is equal to or greater than about 135 GPa. In the preferred embodiments of the invention, the cross-sectional diameter of the fiber is from about 5 Mm to about 100 Mm, the tenacity of the fiber is from about 1.4 GPa to about 6.5 GPa, and the tensile modulus of the fiber is from about 135 GPa to about 700 GPa. In the particularly preferred embodiments of the invention, the fiber diameter is from about 10 um to about 80 um, fiber tenacity is from about 2.5 GPa to about 4.56 GPa and the tensile modulus is from about 300 GPa to about 550 GPa, and in the most preferred embodiments of the invention, the fiber diameter is from about 25 um to about 50 um, fiber tenacity is from about 3.5 GPa to about 4.0 GPa and tensile modulus is from about 350 GPa to about 450 GPa.

The fiber of this invention is also resistant to high temperature (equal to or greater than about 1000° C.). As used herein a fiber is resistant to a temperature when the tenacity and tensile modulus of the fiber do not vary more than about 30%, preferably not more than about 25%, more preferably not more than about 10% and most preferably not more than about 5% on exposure of the fiber to the temperature in the presence or absence of oxygen for a period of up to about 5 hours, preferably of up to about 20 hours, more preferably of up to about 50 hours and most preferably up to about 100 hours.

An advantage of the process of this invention is that it provides for the manufacture of metal and non-metal carbide fibers in mono-filament form or in multifilament form having more than one filament. In the preferred embodiments of the invention the fiber is a mult-filament fiber. In these embodiments the number of filaments may vary widely depending on the particular application. In the preferred embodiments, the number of filaments is from 2 to about 1,0000. More preferred are those embodiments of the invention in which the fiber includes from about 5 or 10 filaments to about 1,000 filaments, and most preferred are those embodiments in which the fiber includes from about 10 filaments to about 500 filaments. Those embodiments of the invention in which the fiber includes from about 10 to about 200 filaments are the embodiments of choice.

The process of this invention can be carried out in a continuous, semi-continuous or batch fashion. The fiber substrate for heat treatment may be introduced into process zones batchwise or it may be continuously or intermittently introduced into such zones during the lo course of the process. The process can be conducted in a single heating zone, or in a plurality of such zones, in series or in parallel.

The non-metal and metal carbide fibers of this invention can be used for many purposes for which metal and non-metal carbide fibers are used. For example, the fibers can be used in the fabrication of fiber reinforced composites. Such composites and processes for their manufacture are well known in the art. See for example, George Labin, Editor "Handbook of Composites", Van Nostrand Runhold Company, NY, N.Y. 1982; John W. Weeton, Dean M. Peters and Karyn L. Thomas, "Engineers' Guide to Composite Materials" American Siciety for Metals, (1987) Metals Park, Ohio.

The types of composites mode employing the composites of this invention may vary widely. For example, continuous carbide fibers can be used to reinforce composites with metal, cearmic, or polymer matrices. Metal matrix composites consist of a metal matrix, preferably a low-density metal, such as aluminum, magnesium, or titanium) reinforced with continuous or discontinuous metal or non-metal carbide fibers. Compared with unreinforced metals, these reinforced composites provide higher specific strength and stiffness, greater wear resistance, higher operating temperatures, beter tensile strength and modulus. Metal matrix composites can be manufactured by conventional procedures known to those of ordinary skill in the art. For example, basic methods of manufacturing metal matrix composites reinforced with continuous metal or non-metal carbide fibers include: liquid metal infiltration, plasma spraying, and modified casting processes. When reinforcing aluminum, metal or non-metal carbide fibers can be placed on an aluminum foil and later sprayed with a plasma of aluminum. This "preform" material is then placed in a mold that reflects the shape of the part, and then consolidated. Small diameter metal or non-metal carbide fibers for reinforcement of titanium can be woven into cloth. The fabric can be sandwiched between sheets of titanium foil. The sandwich can be formed into the desired shape by placing the preferomed sheet in a mold and enclosing the mold in a steel vacuum bag. The assembly can be placed in a hot isostatic press that operates at higher temperatures and pressures as compared with conventional autoclaves.

The fibers of this invention may also be used in the manufacture of ceramic matric composites. Ceramic matrix composites comprises a ceramic such as continuous alumina, carbide, nitride, boride or the like reinforced with continuous or discontinuous non-metal or metal carbide fibers. Compared with unreinforced metals, monolithic ceramics often have better wear resistance, chemical stability, lower thermal conductivity, lower thermal expansion and higher temperature strength. However, the main drawback with monolithic ceramics is brittleness. The low toughness causes ceramics to fail catastrophically when sufficient stress is applied to propagate cracks. To overcome this drawback ceramics may be reinforced with continuous fibers and other reinforcements such as whiskers and particulates. Reinforcements dramatically improve the fracture thoughness compared with monolithic ceramics.

Metal or non-metal carbide fibers, such as silicon carbide fibers improve the fracture toughness as for example to a level of four to five times the value of unreinforced ceramic. Methods of forming ceramic matrix composites are well known and will not be described in detail. Any such conventional procedures may be used.

The metal or non-metal carbide fibers of this invention can also be used in the fabrication of polymer matrix composites. Such fibers provide for improved compressive strength, tensile strength and/or tensile modulus. Such polymer composites can be formed using conventional polymer molding techniques known in the art.

The fiber composites of this invention can be used for conventional purposes, For example, metal and ceramic composites can be used in the fabrication to get engine parts. For example, metal and non-metal carbide fiber filled metal composites such as silicone carbide and reinforced titanium and titanium aluminide can be used in the fabrication of jet engine rotors, disks and fan blades. Fiber reinforced ceramic composites such as silicon carbide reinforced with silicon carbide fiber can be used in the fabrication of radiant and industrial burners, and heat exchanges. Fiber reinforced polymer composites such as epoxy resin composites reinforced with silicon carbide yarns can be used in the fabrication of ten is rackets and the striking face of golf club heads.

The following specific example is presented to more particularly illustrate the invention and are not to be construed as limitations thereon.

EXAMPLE I

A. Silicon Ball Milling:

A 1400 cc grinding tank (Tafzel coated) jacketed for heating/cooling equipped with a stainless shaft with tungsten carbide arms was charged with a mixture of 1000 $\frac{3}{16}$' SiC balls, 500 g silicon (Superior Graphite Co, Chicago, Ill.; F Grade), 7.5 g boron (average particle size 400 A°), and 650 ml haptane. The tank was connected to a batch attritor equipment (model 01 -HD Union Process, Akron, Ohio), and silicon was milled by using variable-speed drive with setting at 600 rpm, under nitrogen atmosphere for 130 h. at room temperature. Water was circulated to maintain temperature. As milling progressed, some hapten was depleted due to continuous nitrogen sweep, thus hapten level was checked at every 24 h, and more haptane added as to bring the level to the original charge. At the end of the milling period the mixture was transferred into a glass container and haptane was distilled off under vacuum at room temperature. The dry mixture of silicon, boron, and SiC balls was sieved to separate balls from powder. Silicon-boron mixture dried at 100° C. in vacuum for 24 h. Surface analysis by light scattering suggested surface area of 17.4 $m^2$/g. The elemental analysis indicated about 3 wt % SiC in the mixture. Oxygen by neutron activation analysis confirmed that silicon has oxidized to $SiO_2$ to about 5 wt %.

B. Silicon-Silicon Carbide Milling:

The mixture of milled 175 g silicon with surface area of over 16 $m^2$/g, 707 g silicon carbide powder (Superior Graphite Co., Chicago, Ill.; grade 059(s) ), 750 g $\frac{3}{16}$' balls and 650 ml haptane was milled for 30 h as described in an above experiment. Following work up the silicon-silicon carbide has surface area of over 22 $^2$/ g.

EXAMPLE II

A. Preparation of Spinning dope Polyacrylonitrile/Silicon (PAN/Si)

In a 5 liter spherical reaction glass vessel, milled 548 g silicon (average particle size <1 μm, about 1 wt % boron)

and 2300 ml dimethylformamide (DMF) were blended using Silverson Mixing Device (model 4R, Boston, Mass.), at full speed for 20 min, while moving the vessel back and forth for uniform mixing (a high speed Waring blender equipped with a crawl blade can be used instead of Silverson mixer, but this will require exposing mixture to humidity while transferring to a 5 liter glass vessel). To this mixture was added 537 g chopped polyacrylonitrile (PAN) fiber used for making high grade carbon fiber (Courtaulds Advanced Material, Sacramento, Calif. 95828). The mixture was than heated to 100° C. using oil heating bath under nitrogen atmosphere while being stirred with a high torque mechanical stirring unit for 20 hr. to obtained complete dispersion of silicon and boron in the PAN/DMF solution. The mixture was cooled to room temperature, flask was equipped with a Dewar type condenser, and degassed in vacuum until almost all the air bubble were removed and DMF began to condensed at the bottom of Dewar type condenser. The mixture was transferred into a spinning tank. The viscosity of the dispersed mixture was 530 poise (53 Pa.s) at room temperature.

B. Preparation of Spinning dope Polyacrylonitrile (PAN)/ Silicon Carbide(SiC)/Silicon(Si)

The mixture was prepared according to the procedure of paragraph A using following weight ratio: SiC 32.97: Si 8.56: PAN 9.90: DMF 48.57.

C. Preparation of Spinning Dope Acrylic/Acrylonitrile Copolymer (PAN:AA)/Silicon Alkoxide Sol:

1. In a flask A: 400 g of a methoxy silicate (Dynasil-40 (D-40)) and 70.16 g absolute methanol were stirred for 10 min. In a flask B: 70.16 g methanol was mixed with 16.84 g water at pH 1.5 and stirred for 10 min. After 10 min stirring the content of flask B was poured in flask A. Following 24 h stirring the excess Methanol was distilled of at 30°–35° C. in vacuum. The Si alkoxide sol formed analyzed for $SiO_2$ content, and stored at 5° C. Depending the extent of reaction $SiO_2$ content varied from 47 to 52%.

2. A 22 liter three-necked flask equipped with a mechanical stirrer, condenser, and a nitrogen inlet and a constant temperature bath maintained at about 80° C. Seventeen liter deionized water was added to this flask and heated for 10 h to deaerate. The temperature of the bath was dropped to 40° C. and allowed the water in the flask to come to bath temperature. At this time, a purified mixture of 1565 ml acrylonitrile and 60 ml acrylic acid (by filtering on a 250 bed volumes of CAT#HR-4, Scientific Polymer Product,Inc., Ontario, N.Y. 14519) was added in the flask and stirred gently for 15 min. to allow the mixture to come to bath temperature. The initiator was then added. It was composed of 18.3 g. of potassium persulfate dissolved in 600 ml. of water, followed after 1 min. by 9.7 g. of sodium bisulfite, in 500 ml water. Almost immediately, the colorless, aqueous solution became somewhat opalescent and P(AN:AA) began to precipitate. The reaction mixture was stirred for 6 hr. The solid polymer was filtered, washed with water, and then with methanol, and dried in a vacuum oven at 60° C. for 24 hr. The yield of polymer 87%. The intrinsic viscosity as measured in DMF was 2.98 (0.5%, 35° C.).

3. To a solution of 275 g copolymer of acrylonitrile and acrylic acid P(AN-AA) (AN:AA about 97:3 wt %)in 1500 g DMF, added dropping (dropping rate 1.5 cc/min), a solution of 421.60 g Si alkoxide sol (47.29 wt % $SiO_2$ content) in 430 g DMF. During the addition period, the PAN/DMF solution was kept at room temperature while maintained gentle stirring. Following addition, the solution was degassed to remove air bubble and transferred to a spinning vessel.

D. Preparation of Spinning Dope PAN/Si Alkoxide Sol:

To a solution of 275 g copolymer of acrylonitrile and acrylic acid P(AN-AA) (AN:AA about 97:3 wt %) in 1500 g. DMF, added dropping (dropping rate 1.5 cc/min), a solution of 421,60 g Si alkoxide sol (47.29 wt % $SiO_2$ content) in 430 DMF. During the addition period, the PAN/DMF solution was kept at room temperature while maintained gentle stirring. Following addition, the solution was degassed to remove air buble and transferred to spinning vessel.

EXAMPLE III

A. Precursor fiber Spinning:

1) Wet Spinning of PAN/Si fiber:

The spinning dope was extruded through a spinneret with an apertures of circular cross sections and of varied diameter, directly into a gel bath. We varied the length of the aperture in the flow direction and found very little effect on fiber properties. The gel bath contained a mixture of DMF and water. In our wet spinning conditions, the optimum ratio of DMF to water was found to be between 75:25 to 80:20 (v/v), to produce dense PAN/Si precursor. When gel bath concentration was below 75:25 (v/v) ratio DMF:water a porous fiber was produced, whereas above 80:20 (v/v) ratio PAN began to dissolve and silicon began to leach out in the gel bath, thus, making it difficult to spin. The gel bath temperature was maintained between 10° to 15° C. The gel fiber was than passed through a wash bath with circulating water in a counter current direction to remove DMF from the fiber. The fiber was than stretched in a steam chest at 140° C. and dried on a heated godet before being spooled on a winder. The strength and denier of the wet spun precursor fiber were governed by four major variables. They are: 1) viscosity of the dope, 2) draw ratio, and 3) jet stretch. To determine their effect we statistically designed two sets totalling 16 experiments using aperture size, dope viscosity, jet stretch, and draw ratio as variables. The tenacity and denier of the yarn samples were measured. Computer analysis of the results indicated that for small diameter aperture (e.g. 8–10 mil), the tenacity of the yarn has a strong dependence on the draw ratio, and a moderate dependence on the dope viscosity. For the large aperture diameter (14–16 mil), yarn tenacity strongly influenced by draw ratio, moderately by jet stretch, and slightly by viscosity. Some second order effects, combination of viscosity and jet stretch, were also observed. In both types of aperture the denier of the filament were affected strongly by jet stretch and moderately by draw ratio. Two empirical (equation 1 and 2) equations were derived to estimate tenacity and draw ratio. Using these equations we had prepared fiber with the desired tenacity and denier.

Equation 1:

$$\text{Tenacity} = (0.02125 - 0.06624)(\text{aperture diameter (mil)}) + (0.07624)(\text{jet stretch} + 0.00115)(\text{viscosity (poise)}) + (0.20937)(\text{draw ratio})$$

Equation 2:

$$\text{Denier} = 6.536 + (2.30425)(\text{aperture diameter (mil)}) - (3.06396)(\text{jet stretch} + 0.0009125)(\text{viscosity (poise)}) - (1.63781)(\text{draw ratio})$$

B. Wet Spinning of PAN/Si Alkoxide Sol Dope:

The spinning conditions are very similar to that described for PAN/Si fiber except the gel bath compositions were different. To hydrolyze Si alkoxide sol to $SiO_2$ the gel bath contained a small amount of hydrochloric acid. We found that about 3 vol % con. HCl in 27/70 (v/v) water:DMF produced round, dense PAN/Si alkoxide sol fiber, but still, depending on the diameter of the filament, about 10 to 25 wt % charged silicon leached out during spinning.

C. Wet-Spinning of PAN/Si dope:

The viscous dope was fed into a spinneret (104 holes, hole diameter 10 mil (254 μm), other hole size were also used 8, 12, 14 and 16 mil) using ZeDrive QM metering digital gear pump, and spun into a coagulation bath (size 6') consisting of 78:22 (v/v) of DMF/$H_2O$ which was maintained between 12° to 15° C. The coagulated fiber was washed in a 8' water bath using counter-current water flow and then taken up on the first godet. The gel stretch was maintained about 1.6 to 1.8. The fiber was then stretched passing through 1' steam chest, at 140° C., and taken-up on the second godet. The fiber was then dried on the third godet and spooled on a bobbin using a winder. Under these conditions, the fiber was stretched 8X, 10X, 12X, and 14X. Depending upon stretching condition, fiber tenacity varied from 1.2 g/d to 2.5 g/d (15a, MPa to 322 MPa). Fiber had 1 to 10% elongation at break. The cross-section examination by the scanning electron microscope (SEM) and the transmitting electron microscope (TEM) of the dried fiber indicated uniform dispersion of silicon and boron in a PAN matrix. The fiber surface had striations. In order to eliminate these striations, the fiber was spun from a spinnerette with holes of high (150) L/D ratio and spun into a coagulation bath saturated with PAN. SEM of fiber surface showed improvement in surface roughness.

D. Dry-Spinning of PAN/Si dope:

The heated (100° C.) viscous PAN/Si (or PAN) dope was fed into a spinnerette (6 inch diameter spinneret block, 100 holes, L/D 6) using ZeDrive QM metering digital gear pump, and spun into a column (vertical column, 20 feet long, 12 inch ID). Heated nitrogen gas was introduced with co-current flow. The column was divided into two zones, which were electrically heated. The fibers were taken up at the bottom on a godet. The pick-up speed can be varied from 0 to 1000 feet/min. The stack drawn fibers were taken up on the spool, and steam stretched as described in wet-spinning method.

E. Wet-Spinning of PAN/Si Alkoxide Sol:

The PAN/Si alkoxide dope was spun similar to PAN/Si dope except the coagulation bath consisted 70:27 (v/v%) DMF:$H_2O$ with 3 vol % conc. HCl. Examination of fiber by TEM showed excellent dispersion of silicon sol (or $SiO_2$) with particles size less than 0.1 μm in diameter PAN/Si dope spinning. Fiber was stretched only between 4X to maximum 8X, Cross-sections were dense according to SEM analysis.

EXAMPLE IV

A. Stabilization of Green PAN/Si Fiber:

The fiber was stabilized using a tubular oven. Fiber yarn was taken-up on an input godet and passed through a 4 zone tubular oven. The four zone temperatures were 15° C., 200° C., 225° C. and 240° C., respectively. Each zone was 20'(508 cm) long and temperature was controlled independently. Total stabilization time was about 240 min to 300 min depending up on the fiber diameter. The thicker diameter required longer time for uniform stabilization from surface to center of the fiber. The fiber yarn was taken up on a out-put godet and spooled by a winder. Controlled amount of was passed through all the zones, and fiber shrinkage was controlled by input and output godet velocity. An optimum fiber shrinkage was found to be about 0 to 2%. The stabilization fiber has a tenacity of about 0.7 g/d (96 MPa) to 1.3 g/d (178 MPa) and an elongation at break of about 3 to 5%.

B. Stabilization of PAN/Si alkoxide sol fiber:

Same tubular oven described above was used to stabilized PAN/Si alkoxide sol fiber, except the zone temperatures were 130° C., 175° C., 200° C., and 240° C., respectively, and in the first zone a 8N $NH_4OH$ solution was sparged at 0.2 cc/min. continuously. The stabilization time varied from 100 min. to 150 min. and the fiber shrinkage was controlled to 0%.

C. Stabilization of PAN/SiC/Si Fiber.

Similar stabilization conditions were used as described for PAN/Si fiber, except shorter contact time of min. was used because very small amount PAN in the fiber.

EXAMPLE V

A. Carbonization and Reaction Sintering

1. Carbonization of Stabilized fiber:

The stabilized fiber yarn was carbonized using gradient temperature condition. The carbonization furnace and high temperature were aligned in a single line operation in order to minimize the handling of carbonize fiber. The fiber was fed from input godet into a 12"(30.48 cm) pre-heated furnace which was maintained at 400° C. The fiber was then passe through a 3 zone furnace: zones 1, 2 and 3 were maintained at 800° C., 1000° C. and 1150° C., respectively. Zone 1 and 3 were about 12" long, and zone 2 was about 18" long. A 65' long, 1" I.D. quartz tube with one end inserted in cooling zone of high temperature while another end used to feed the fiber, and equipped with an open port to remove the tar gases and argon, was used to maintained the inert atmosphere of argon gas. The argon was purified using a gettering furnace, and passed in both the furnaces from high temperature furnace gas inlet. Carbonized fiber was then passed through High temperature furnace, and taken up on a spool using winder. Fiber tension was maintained by controlling feed spool and pick-up spool velocity. Depending up on sintering time in the high temperature furnace, the carbonization time varied from 25 to 75 min.

2. Reaction-Sintering of Carbon/Silicon Fiber:

As indicated in the above experiment, the carbonized fiber was spooled at the end of the high temperature furnace. Thus, to carry out reaction-sintering experiments the high temperature was turned on using programmable controller using the type C thermocouple. The furnace used was model 10-2693, resistive heating using graphite heating elements, purchased from Centorr Furnace/Vacuum Industries Inc., 542 Amherst Street, Nashua, N.H. Generally, the ramping rate was 50° C./min, and maximum temperature was studied from 2050° C. to 2100° C. Above this temperature a color optical pyrometer is required. Purified argon was passed through a gettering furnace and passed into the furnace at the center and at both ends at a flow rate was maintained at about 5 lit./min. The real heating zone in the furnace was about 12", therefore the contact time was calculated based on this length and out godet velocity. the contact time studied varied from 1 min. to 60 min.

SiC fiber was produced with 39 msi tensile modulus and 0.1% elongation at break form SiC/Si/PAN precursor fiber. The precursor fiber contained 45.2:15.3:39.3 vol ratio of SiC:Si:PAN, respectively (wt ratio 64.1: 16.6:19.3). This fiber should produce carbonized fiber with over 2.0 g/cc density, thus, minimizing shrinkage during sintering to produce fully dense SiC fiber. The multifilament precursor fiber, following stabilization and carbonization, was converted to SiC fiber and sintered at 2150° C. for one hour in a continuous mode. According to X-ray analysis the fiber has less than 2 wt % amorphous impurities. The tensile moduli were measured for AVCO monofilament fiber and for our fiber using single filament samples. This requires measurements on two different gauge length samples in order to take into account the contribution of the epoxy mountings. For example, for one and two-inch gauge measurements, if applied stress is kept constant, then subtracting strain for one-inch gauge sample from two-inch gauge sample should give modulus for only one-inch gauge fiber. Using this method, 57.5 msi tensile modulus was obtained for AVCO fiber (reported 58 msi), and for our fiber the modulus varied from 37.4 to 39 msi. In this measurement the biggest source of error is the fiber diameter. The SEM cross-section measurement has about 3 to 5% error.

What is claimed:

1. A fiber consisting essentially of a metal or non-metal carbide having a density equal to or greater than about 85% of the theoretical density of said carbide, said fiber having an average cross-sectional diameter of less than about 100 Mm, a tenacity of at least about 1.46 Pa and a tensile modulus of at least about 135 GPa.

\* \* \* \* \*

UNITED STATES PATENT AND TRADEMARK OFFICE
CERTIFICATE OF CORRECTION

PATENT NO. : 5,654,094
DATED : August 5, 1997
INVENTOR(S) : Kundan M. Patel and Frank Mares It is certified that error appears in the above-identified patent and that said Letters Patent is hereby corrected as shown below:

Column 3, line 46, change "Mm" to --micrometer--

Column 3, line 57, change "Pa" to -- GPa--

Column 14, line 29, change "Pa" to --GPa--

Column 14, line 32, change "Mm" (both occurrences) to --micrometer--

Claim 1, column 22, line 5, change "Mm" to --micrometer--

Claim 1, column 22, line 6, change "Pa" to --GPa--.

Signed and Sealed this

Twenty-fourth Day of November,1998

Attest:

BRUCE LEHMAN

Attesting Officer

Commissioner of Patents and Trademarks